July 17, 1962 H. ZSCHEKEL 3,045,213

MAGNETIC STORAGE SYSTEM

Filed Dec. 3, 1956

INVENTOR

HANS ZSCHEKEL

BY Robert Harding Jr.

ATTORNEY 3,045,213

MAGNETIC STORAGE SYSTEM

Hans Zschekel, Stuttgart, Germany, assignor to International Standard Electric Corporation, New York, N.Y., a corporation of Delaware

Filed Dec. 3, 1956, Ser. No. 625,700
Claims priority, application Germany Dec. 6, 1955
1 Claim. (Cl. 340—172.5)

Figure 1:
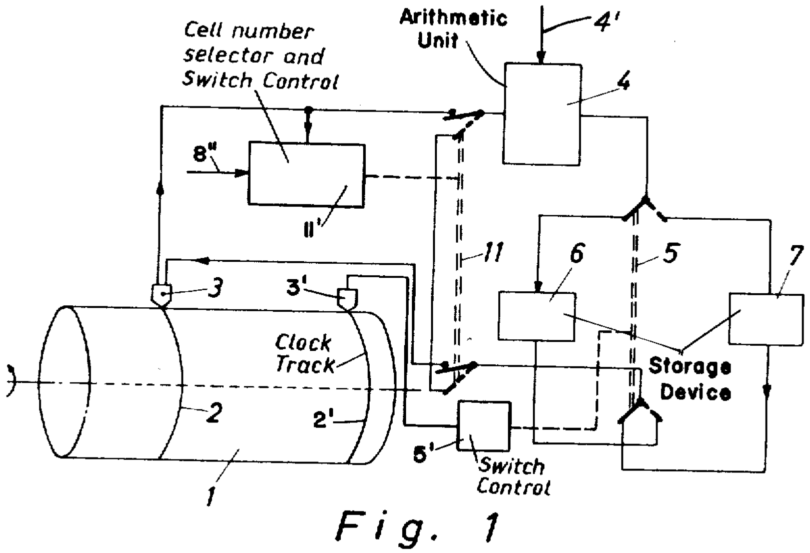

The invention relates to an arrangement for the removal of information from rotating magnetic storage devices for the purpose of effecting a calculative correction of the removed information and for re-storing the corrected informations, in particular the controlling of an intermediate storage system with the aim of increasing the operating speed. In many cases of the data processing system technique it is desirable to effect a timely storing of some informations, and to provide for removing them from the storage at a given time position for being further processed. Among the various known types of storage systems there are the rotating magnetic storages, that is, either the magnetic drums or the magnetic tapes. In the case of a frequent removal of informations with the aim of correcting these informations on account of new statements, e.g. in the case of an input of informations via a plurality of connected input devices, it is desirable to reduce the time required for effecting the corrections as much as possible.

There are two principal possibilties for reading and writing with the rotating types of magnetic storage systems. Either separate reading and writing heads may be used or one common magnetic head may be used for both of these processes. Hence in the first case two heads are required for each magnetic trace, these heads being staggered with respect to one another. Such an arrangement, especially with a plurality of magnetic traces, entails a high expense on materials as well as a difficult adjustment. Of course, these difficulties are avoided with the arrangement of the second type, but otherwise under the same conditions, double the operating time is required, because one can only either read or write every second rotation, so that, accordingly, only one information can be processed in the course of two drum rotations. By increasing the number of rotations of the rotating storage in a given period, the operating time may, of course, be shortened, but such high speeds are the cause of difficulties with respect to the bearings.

One object of the invention is to provide an arrangement in which the operating time, by avoiding the aforementioned disadvantages, is relatively short. The invention is particularly concerned with an arrangement for removing informations from a rotating storage device, especially from a magnetic drum, for the purpose of allowing a calculative processing or correction, and for re-storing the thus corrected information into the same storage element by means of combined reading/writing heads. According to the invention the arrangement consists of an intermediate storage system composed of two intermediate storage devices, which system is controlled during the reading- and writing-process by an electronic switch in such a way that during one storing rotation the storing of the corrected information into one intermediate storage device is effected, and at the same time the information from the other intermediate storage device is removed therefrom and placed in that portion of the rotating storage device from which the information had been removed during the previous storage rotation.

Another feature of the invention consists in controlling the intermediate storage devices in such a way that when calling or seizing the same storage cell during two successive storage rotations, before the information belonging to this particular cell, and which had already been removed at the first seizure and corrected accordingly, has been re-stored, a reading from the cell seized during the second storage rotation is prevented and the information contained in one of the two intermediate storage devices, instead of being fed to the rotating storage, is fed to the arithmetic unit for effecting a new correction. Preferably and appropriately a comparison device or comparator is provided in which the cell numbers seized in the course of two successive storage rotations are compared with one another and also an electronic switching device is provided which, when the cell numbers are alike, effects a switching-over of the flow of information.

Figure 2:
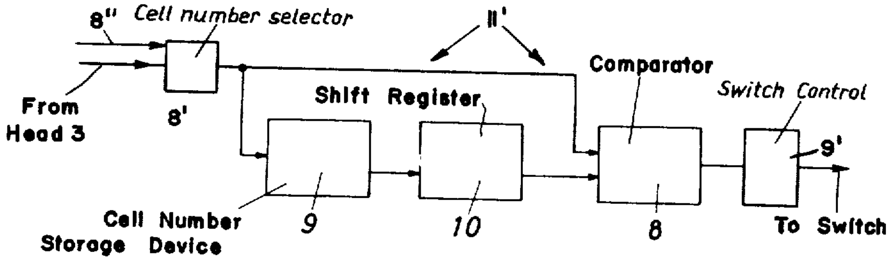

In the following the invention will be described in particular with reference to an exemplified embodiment shown in the accompanying drawings, in which:

FIG. 1 shows a schematic representation of the switch-over arrangement for the intermediate storage devices, and FIG. 2 shows a schematic representation of the cell-number comparison device or comparator.

A magnetic drum 1 is employed as a rotating storage, on which the magnetic traces are deposited in the conventional manner, one magnetic trace 2 being shown. The magnetic head 3 serves the reading as well as the writing and may be any well known type of read-write head. Upon calling or seizing a storage cell in a known manner, not shown, the magnetic head will read off the corresponding information when the drum passes underneath the head in the course of its rotation. The information thus taken off is then fed to the arithmetic unit 4 which having received a suitable signal in a known manner over the input 4', carries out the necessary arithmetic operations. Depending on the position of the electronic switching device 5, the corrected information is then fed either to one or the other of the intermediate storage devices 6 and 7.

The electronic switch 5 is operated by a switch control circuit 5' which may be controlled by a clock pulse read from a special clock track 2' by means of a head 3'. The clock pulse coincides with the end of the track 2 and energizes the switch control circuit 5', so that the switch shifts from whichever position it is in to the other position.

During the rotation of the drum in which storing into one intermediate storage device is effected, removal of the information stored in the other intermediate storage device and originating during the previous rotation of the drum is also effected, and this information is re-stored in the same cell of the drum from which it was originally taken. After the termination of this one rotation of the drum, the clock pulse controls the switch control circuit to cause the switch 5 to reverse the connections of the two intermediate storage devices, so that at the next successive rotation, the removal of the information from the first intermediate storage device will be effected, while a storing is effected into the second one. Hence during each rotation of the drum one storing and one removal of information is effected, respectively alternating from rotation to rotation.

Whether the reading or the writing is effected first in the course of one rotation depends upon the position of the seized storage cells on the surface or circumference of the drum during the previous and the just described rotation of the drum. If the cell seized during the previous rotation is lying in front of the newly seized cell, then a re-storing into the first cell will be effected at first in the course of the just described rotation, and, thereafter, the reading of the second cell will be effected. In the opposite case, the reading and writing process is carried out vice versa.

Besides the two described cases it may also happen that the same storage cell is seized twice in the course of two successive rotations of the drum. In this case the corrected information originating with the first seizure is still contained in one of the intermediate storage devices. Since this information, according to the second seizure, is supposed to be corrected again,, care has been taken, in accordance with another feature of the invention, that a reading of the corresponding cell of the rotating storage drum will be prevented, because of not representing the latest state, and that the information, stored in the intermediate storage device, instead of being sent to the storage, will be fed again to the arithmetic unit, where the second correction will be carried out. Thereupon the thus corrected information will be fed into the free storage device.

This procedure is effected by means of an electronic switch 11 which, when in the position shown in solid lines, connects the reading coil of the head 3 to the arithmetic unit 4 and the output of one or the other of the storage devices 6 and 7 to the writing coil of the head 3 and which, when in the position shown in dotted lines, disconnects the head 3 from both the arithmetic unit and the output of the storage device and connects the output of the particular storage unit to the input of the arithmetic unit.

The switch 11 is controlled by a cell number selector and switch control 11' connected to the head 3 and shown more in detail in FIG. 2. This device comprises a cell number selector 8' which is connected to the head 3 and receives signals read from the track 2. Each of the cells of the track 2 is provided with an identifying number and the cell number selector 8' is arranged in a known manner to separate the cell number from the rest of the information contained in the cell. When a cell is seized, a signal is delivered over the input 8'' in a known manner which renders the cell number selector 8' operative and the cell number from head 3 is fed to a comparator 8, once directly, and secondly via a cell-number storage device 9 and a shift register 10. The delay between the direct and the indirect feed-in amounts to exactly one rotation of the storage means. Hence in this way, the comparator 8 compares the cell numbers of the cells seized in the course of two successive rotations. In the case of different numbers, which would normally be the case where changes are to be effected in successive different cells, the comparator 8 produces no output and no change is effected in the circuit. However, where there is an equality with respect to the cell numbers, the comparator produces an output which operates the switch control circuit 9' and the electronic switch 11 is caused to switch-over, so that the informations leaving the intermediate storage device will be fed to the arithmetic unit 4 again, and so that, on the other hand, the reading of the seized cell is prevented.

What is claimed is:

A magnetic storage system comprising a rotatable storage device having a plurality of sequential storage cells thereon, a combined reading and writing head having a reading output and a writing input arranged in operative relation with said device for reading information from and writing information into said cells, an arithmetic unit arranged for performing selected arithmetical operations on information fed thereto, means for feeding information from the reading output of said head to said arithmetic unit, an intermediate storage system comprising two intermediate storage devices, switching means for alternatively connecting the output of said arithmetic unit to the input of the first of said intermediate storage devices and the output of the second of said intermediate storage devices to the writing input of said head or the output of said arithmetic unit to the input of the second of said intermediate storage devices and the output of said first of said storage devices to said writing input of said head, means controlled by signals from said reading output for operating said switching means at each rotation of said storage device, and means responsive to the seizure of the same cell in two successive rotations of said storage device for preventing the reading of the cell during the second rotation and connecting the output of the intermediate storage device whose input was connected to the output of the arithmetic unit during the first rotation to the input of said arithmetic unit, whereby information stored in said last-mentioned intermediate storing device is fed to said arithmetic unit for the purpose of effecting a new correction, said means comprising a comparator, first means for feeding a selected identifying signal to said comparator, second means including a delay device arranged to produce a delay equal to the time of one rotation for feeding said selected signal to said comparator, said comparator adapted to produce a signal when the same signals are fed simultaneously to said comparator over said first and second feeding means, switching means for disconnecting the reading and writing head from the input of the arithmetic unit and connecting the outputs of the intermediate storage devices to said arithmetic unit when said switching means is in a first condition and alternatively connecting said head to said arithmetic unit and the outputs of said intermediate storage devices to said head when said switching means is in a second condition, means for normally maintaining said switching means in said second condition, and means responsive to the signal from said comparator for causing said switching means to assume said first condition.

References Cited in the file of this patent

UNITED STATES PATENTS

| | | |
|---|---|---|
| 2,604,262 | Phelps et al. | July 22, 1952 |
| 2,636,672 | Hamilton | Apr. 28, 1953 |
| 2,700,148 | McGuigan et al. | Jan. 18, 1955 |
| 2,832,064 | Lubkin | Apr. 22, 1958 |
| 2,916,210 | Selmer | Dec. 8, 1959 |

OTHER REFERENCES

McGuigan: "Combined Reading and Writing on a Magnetic Drum," Proceedings of the I.R.E., October 1953, page 1438.